C. E. SEAL.
Cut-Off and Regulating Cocks for Gas.
No. 6,045. Reissued Sept. 8, 1874.
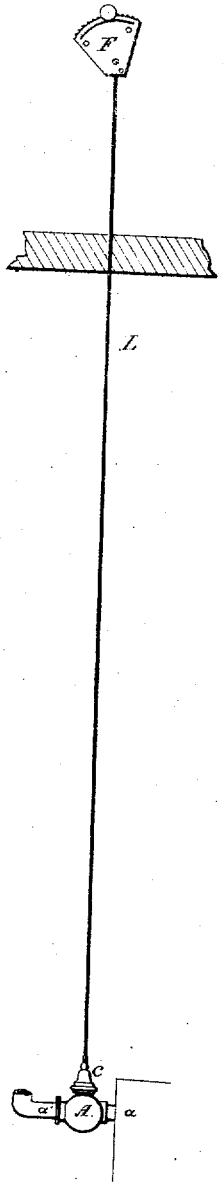
Fig. 1.
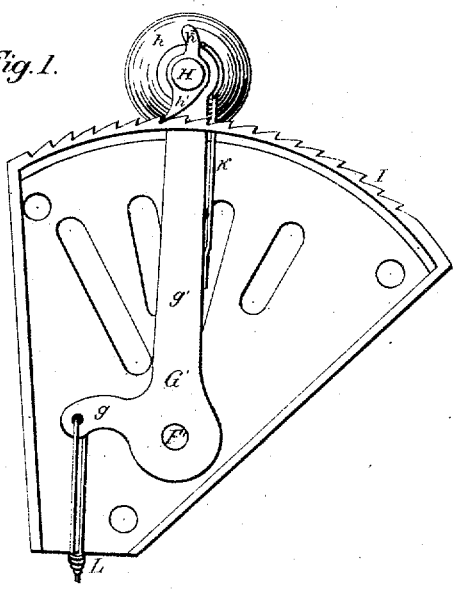
Fig. 2.
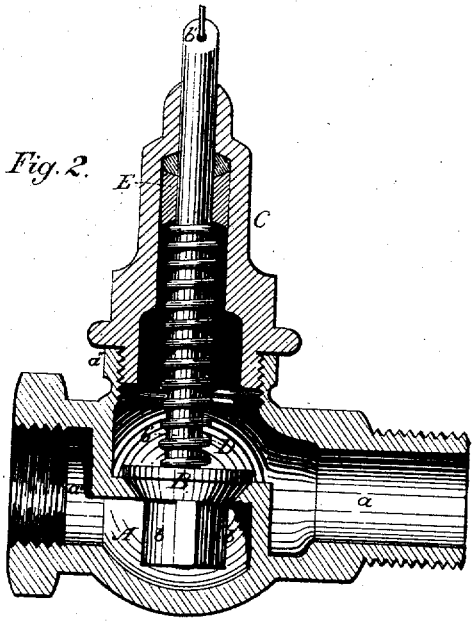
Attest:
Wm. H. Fincke
R. H. Whittemore
Inventor:
Charles E. Seal
by A. C. Bradley
His Attorney
THE GRAPHIC CO. PHOTO-LITH. 39 & 41 PARK PLACE, N.Y.

UNITED STATES PATENT OFFICE.

CHARLES E. SEAL, OF WINCHESTER, VIRGINIA, ASSIGNOR OF ONE-HALF INTEREST TO EDWIN F. BROOKS.

IMPROVEMENT IN CUT-OFFS AND REGULATING-COCKS FOR GAS.

Specification forming part of Letters Patent No. 140,549, dated July 1, 1873; reissue No. 5,585, dated September 30, 1873; reissue No. 6,045, dated September 8, 1874; application filed June 22, 1874.

*To all whom it may concern:*

Be it known that I, CHARLES E. SEAL, of Winchester, in the county of Frederick and State of Virginia, have invented a new and Improved Cut-Off and Regulating-Cock for Gas, of which the following is a specification:

The invention consists in a cock or valve to be attached to or near a gas-meter or to gas-conveying pipes, the valve having an automatic opening or closing movement, and a suitable mechanism connected therewith and located at some distance therefrom, either in the same or a different room or apartment, by means of which the valve can be positively moved to and held at any desired gage; and the object of the invention is to place the control of the supply of gas to the meter and distributing-pipes in some convenient locality, either in the same room or apartment, or in some other part of the building in which the regulating-cock is used, and thereby avoid the necessity of seeking the locality of the meter for the purpose of turning on or off or modifying the supply.

Figure 1 is a rear view of the valve-operating mechanism. Fig. 2 is a vertical longitudinal section of the regulating-cock; and Fig. 3 is an elevation, showing the cock and operating mechanism connected.

In the several figures the same letter of reference is used to indicate corresponding parts.

A is the valve-chamber, connecting with the service-pipe by an end tube, $a^1$, and with the meter by an end tube, $a$. B is the valve, having guide-flanges $b$ and a stem, $b'$, and $a^2$ is its seat. The stem $b'$ is surrounded by a spiral spring, D, passes through a top opening in cap-tube C, and is perforated at its end to receive a wire, L. The cap-tube C screws into the tube $a^4$ of the valve-chamber. A tight joint is made between the stem $b'$ and the cap-tube C by interposing a concaved sliding sleeve, E, between the spiral spring D and the concaved end of the cap-tube, and filling the space between the sleeve and end of cap-tube with suitable packing. F is the frame, to which the operating mechanism is attached, and which is designed to be located in any convenient or preferred place in the building in which the gas-regulator is used. G is a bell-crank lever, pivoted to the frame at F'. Its shorter arm, $g$, has attached to it the wire L, connecting with the valve-stem, and its longer arm, $g'$, carries a knob, $h$, and a spring-pawl, $h^1$, which works in a curved ratchet, I. K is a spring, secured to the arm $g'$ of the lever, the purpose of which is to keep the end of the pawl upon the ratchet. The end $h^2$ of the pawl can be used to withdraw the other end from the ratchet.

The operation is as follows: The frame F being secured in the desired locality in the room or building in which the regulator is used, the lever G is connected with the valve-stem by means of wire in the manner customary with house-bell connections, or by any other proper and suitable means. The movement of the lever G, then, will cause a corresponding opening or closing of the valve, and, by means of the pawl $h^1$ and ratchet I, the valve can be held at any desired gage. The valve being by preference self-closing, the releasing the pawl from the ratchet will enable the spring D to act and cut off the supply, while the positive movement of the lever in the direction permitted by the action of the pawl upon the ratchet will open the valve, and enable the consumer to regulate the supply to his wants.

By this invention, therefore, at any desired point at which the operating mechanism may be located, the supply of gas to the building or room may be cut off from or regulated to the meter and distributing-pipes, and thereby the waste consequent upon unnecessary pressure in the pipes be prevented.

I claim as my invention—

1. The combination of a valve having a complete automatic movement in one direction with a mechanism for positively moving it in the other direction, and holding it at any desired gage.

2. The valve B, having a stem, $b'$, in combination with its valve-chamber A, the lever G, and the ratchet-and-pawl mechanism I $h^1$ $h^2$, substantially as and for the purpose set forth.

CHAS. E. SEAL.

Witnesses:
W. M. BUSEY,
JULIUS C. HOLMES.